(12) United States Patent
Hoth et al.

(10) Patent No.: US 8,538,575 B2
(45) Date of Patent: Sep. 17, 2013

(54) AUTOMATIC BORE SIZE CONTROL BY COMPLETELY INTEGRATING AN AIR GAGE SYSTEM INTO THE MACHINE CONTROL

(75) Inventors: Timothy P. Hoth, St. Peters, MO (US); Carl A. Mik, St. Louis, MO (US); Russell L. Jacobsmeyer, Labadie, MO (US)

(73) Assignee: Sunnen Products Company, St. Louis, MO (US)

( * ) Notice: Subject to any disclaimer, the term of this patent is extended or adjusted under 35 U.S.C. 154(b) by 629 days.

(21) Appl. No.: 12/439,927

(22) PCT Filed: Sep. 5, 2007

(86) PCT No.: PCT/US2007/019345
§ 371 (c)(1),
(2), (4) Date: Mar. 4, 2009

(87) PCT Pub. No.: WO2008/030464
PCT Pub. Date: Mar. 13, 2008

(65) Prior Publication Data
US 2010/0198390 A1    Aug. 5, 2010

(51) Int. Cl.
*G06F 19/00* (2011.01)
*B24B 1/00* (2006.01)
*B24B 7/00* (2006.01)

(52) U.S. Cl.
USPC ........... 700/174; 700/175; 700/186; 700/195; 700/204; 451/51; 451/61; 451/119; 451/127

(58) Field of Classification Search
CPC .............................................. G05B 2219/36288
USPC .......... 700/174, 175, 204, 186, 195; 451/51, 451/61, 119, 127
See application file for complete search history.

(56) References Cited

U.S. PATENT DOCUMENTS 4,291,504 A * 9/1981 Fitzpatrick et al. ............. 451/22
4,782,598 A * 11/1988 Guarini ........................... 33/503
(Continued)

FOREIGN PATENT DOCUMENTS
GB          2060176 A       4/1981

OTHER PUBLICATIONS
Ono et al., "Development of a Force Control System for Multi-Degree-Of-Freedom Machines", Oct. 31, 1988, pp. 403-408.
(Continued)

*Primary Examiner* — Kavita Padmanabhan
*Assistant Examiner* — Darrin Dunn
(74) *Attorney, Agent, or Firm* — Matthews Edwards LLC

(57) ABSTRACT

A machine controller includes a memory and a processor configured for operating a machine control for automatically controlling apparatus for performing a machining process on a workpiece at least partially as a function of data relating to a parameter of the workpiece, and a gage control for automatically controlling gaging apparatus for collecting and processing the data relating to the parameter of the workpiece and storing the data in the memory. At least a portion of the memory in which the data relating to the parameter of the workpiece is stored, is configured as a shared memory so as to allow the machine control to immediately retrieve and use the stored data relating to the parameter of the workpiece. The controller has particular utility for use in controlling a honing process and a gaging process, which can be in-process or post-process, and which can be used for bore sizing and other parameters.

9 Claims, 5 Drawing Sheets

(56) References Cited

U.S. PATENT DOCUMENTS

| | | | | |
|---|---|---|---|---|
| 4,887,221 | A | * | 12/1989 | Davis et al. .................. 700/181 |
| 4,945,685 | A | * | 8/1990 | Kajitani et al. ................. 451/27 |
| 4,974,165 | A | * | 11/1990 | Locke et al. .................. 700/193 |
| 5,531,631 | A | | 7/1996 | Judge ................................ 451/5 |
| 6,269,284 | B1 | | 7/2001 | Lau et al. |
| 6,415,191 | B1 | * | 7/2002 | Pryor ............................. 700/95 |
| 6,446,351 | B1 | * | 9/2002 | Zhang et al. .................... 33/832 |
| 6,980,881 | B2 | | 12/2005 | Greenwood et al. |
| 6,999,846 | B2 | * | 2/2006 | Kato et al. .................... 700/193 |
| 7,371,149 | B2 | | 5/2008 | Cloutier et al. |
| 2001/0034196 | A1 | * | 10/2001 | Hyatt et al. ...................... 451/61 |
| 2004/0064735 | A1 | * | 4/2004 | Frazier et al. ................. 713/201 |
| 2005/0085940 | A1 | * | 4/2005 | Griggs et al. ................. 700/181 |
| 2008/0046603 | A1 | * | 2/2008 | Kobayashi et al. ............. 710/17 |
| 2008/0147220 | A1 | * | 6/2008 | Ooe et al. ........................ 700/96 |
| 2008/0275660 | A1 | * | 11/2008 | Bhateja et al. ................ 702/104 |
| 2010/0131077 | A1 | * | 5/2010 | Brown ............................ 700/11 |
| 2010/0131079 | A1 | * | 5/2010 | Brown et al. ................... 700/17 |

OTHER PUBLICATIONS

Stewart et al., "Integration of Real-Time Software Modules fir Reconfigurable Sensor-Based Control Systems", Proceedings of the IEEE/RSJ International Conference on Intelligent Robots and Systems, Raleigh, NC, vol. 1, Jul. 7, 1992, pp. 325-332.

Chen et al., "Development and Implementation of a Real Time Embedded Control System for Machine Tools", Aug. 1, 2006, pp. 1-5.

Supplementary European Search Report for corresponding PCT/EPC patent application No. 07837735.5, dated Sep. 6, 2010, 8 pages.

Corresponding PCT International Publication No. WO 2008/030464, published Mar. 13, 2008, which application is also published as European Publication No. EP 2069991, published Jun. 17, 2009.

* cited by examiner

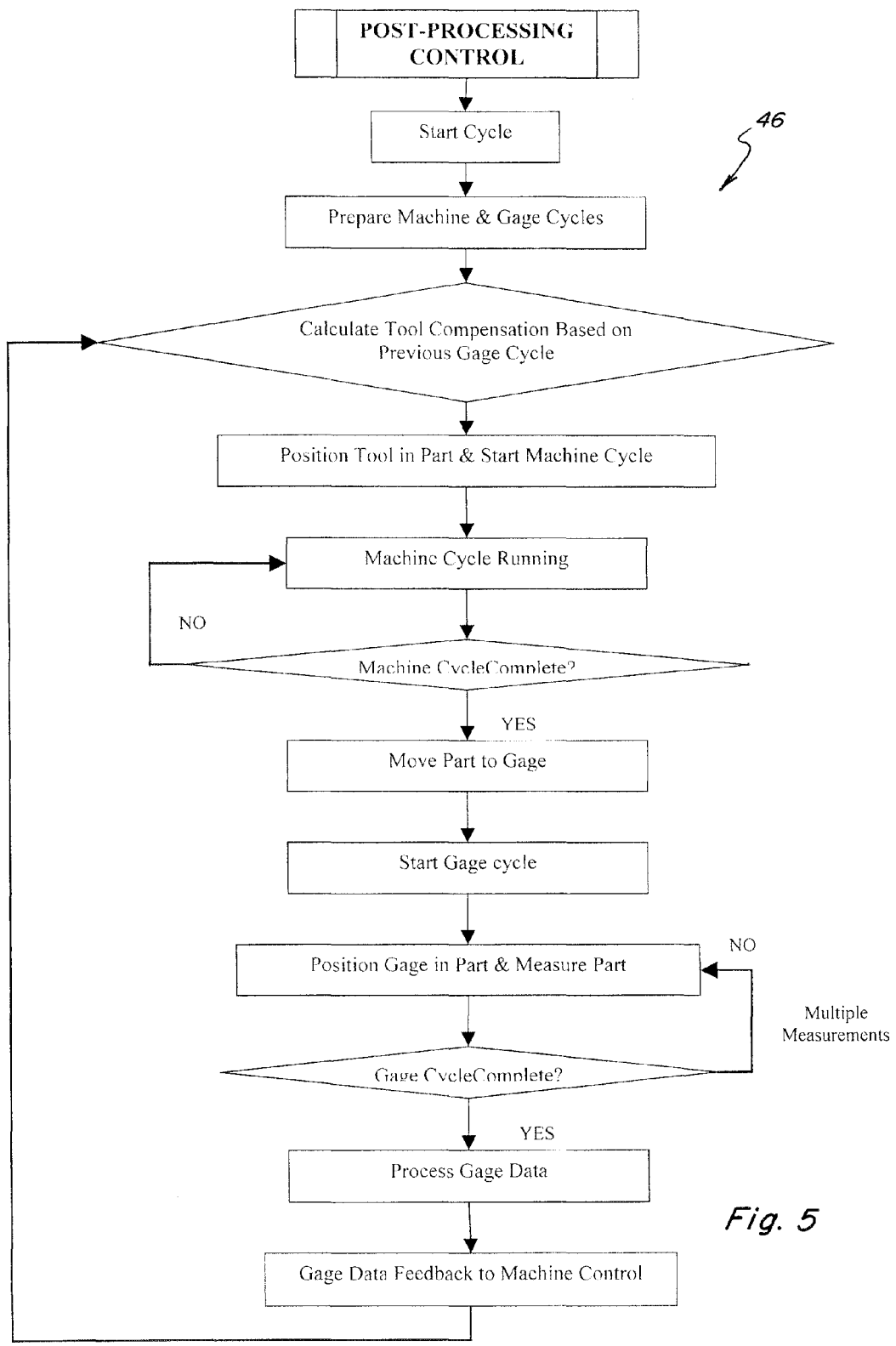

AUTOMATIC BORE SIZE CONTROL BY COMPLETELY INTEGRATING AN AIR GAGE SYSTEM INTO THE MACHINE CONTROL

This application is submitted under 35 U.S.C. 371 claiming priority to PCT/US2007/019345, filed Sep. 5, 2007, which application claims the benefit of U.S. Provisional Application No. 60/842,319, filed Sep. 5, 2006.

TECHNICAL FIELD

This invention relates generally to a machine control, and more particularly, to a system for automatically controlling machining parameters, by integrating a gage system into the machine control.

BACKGROUND OF THE INVENTION

Hoth, et al. U.S. Provisional Application No. 60/842,319, filed Sep. 5, 2006, entitled Automatic Bore Size Control By Completely Integrating An Air Gage System Into The Machine Control, is incorporated herein by reference in its entirety.

A machine's control process can be improved utilizing information feedback from a gaging system that measures a machined feature immediately after the machine cycle is finished. This concept is particularly applicable to machining processes, such as honing a bore of a workpiece.

The information is used to compensate or offset the existing parameters that control the honing or other machining operation. This can be done for either in-processing or post-processing gaging.

In-process gaging involves determining or measuring machined parameters, during the machining cycle. In honing, in-process gaging is typically implemented by gaging the bore during the honing machine cycle, and may utilize a gage capability incorporated into the honing tool. Using this method, the machine monitors the actual gage measurement to know when to end the machine cycle. When honing in this mode, all aspects of the cycle, particularly pertaining to the feed system for the honing tool, are controlled by the gage reading. Presently, when utilizing a gage in this manner, there will be a time period, or latency, between when the measurement is made, and when the machine control can read the measurement, which latency is often undesirable, as it slows the honing process.

Post-process gaging typically involves measuring the bore or other machined feature after the machine cycle is complete. The gage control system will acquire the bore measurements and then process the data to determine whether or not compensation needs to be made. This information is then passed on to the machine control system which will typically make the necessary adjustments at the beginning of the next machine cycle.

Interfacing a Gage System to an Existing Machine

Typically, known machines utilizing either in-process or post-process gaging, would do so by means of a separate gaging system hardwired to an existing machine. The two controllers, one on the machine and the other on the gaging system, would communicate through some type of electrical devices, for example, discrete I/O lines or a serial bus. In some instances, the gaging system may even control various motors or other positional type devices to locate the gage in position for taking a measurement, e.g. positioning an air probe in a bore.

An advantage of having the gage system as a separate unit from the machine is that it can be incorporated into a machine after the machine has been built and is operational. The initial design of the machine does not necessarily have to take into account that it needs to interface to a gaging system.

A disadvantage of this type of machine/gage system is the latency, that is, the time it takes for data feedback from the gaging control system to the machine control system, and processing time. The information sent to the machine by an external gaging system would typically lag too much in time and could not be used to control an in-process gaging operation, or dynamically display the data. Another disadvantage would be the cost and time to implement the additional gaging system. This would be particularly true if the machine does not have an existing means to interface with the gage system. In addition to needing a method of communication between the two control systems, a physical hardware connection would be required for safety reasons. An example is the Emergency Stop circuitry presently used on all computer-controlled machines. When an Emergency Stop button is pressed, a fault condition exists, and all machine movement is immediately stopped. In some situations it is probable that various machined components will be controlled by one or both systems, so both systems must communicate when the other is in a fault condition so that all movement is stopped.

Additionally, when utilizing separate machine and gaging controls, there would be redundancies inherent to connecting two different control systems together. Since both systems would require power it is very feasible that each would have its own power source including the safety devices for the power circuits. Both systems would have their own display and controller. As a result, the operator would have to learn to operate two different systems.

All these things require time and money to design, and put into operation. Some air gaging integrations into machines can be quite complex involving numerous cables and connections. The more complex a system is, the more unreliable it becomes.

Thus, what is sought is in a capability of integrating a gaging system into a machine control, which provides one or more advantages of in-process and/or post-process gaging to a machining operation, particularly a honing operation, and which overcomes one or more of the disadvantages and shortcomings set forth above.

SUMMARY OF THE INVENTION

An integrated gaging system and machine control, which provides one or more advantages of in-process and/or post-process gaging to a machining operation, particularly a honing operation, and which overcomes one or more of the disadvantages and shortcomings set forth above, particularly with regard to latency and complexity, is disclosed.

Integrating a Gage Control into the Machine Control

According to a preferred aspect of the invention, the difficulties and shortcomings of adding an "off-the-shelf" gage system to an existing machine, are reduced or eliminated. Instead of physically connecting an air gage system to an existing machine, the gaging system is instead integrated into the machine design. That is, both the machine control and the gage control reside in the same controller, and are operated through a single interface or display. All communication between the machine control and gage control are through software utilizing a communications protocol and shared memory, on the same controller. And, the gage control system integrated into the machine design according to the invention, can utilize existing gage processing and quality control software.

This eliminates all the disadvantages that arise by adding, rather then integrating, a gage system into a machine, including, an air gage system into a honing machine. Because all data is directly fed back from the gage control to the machine control through memory shared on the same controller, latency is reduced, to thereby allow for immediate response to changes in the gage data, and dynamic display of gage readings is possible. The cost and time for integration is greatly reduced because the hard wired connections for things like power, safety circuits, and communication with a separate gaging system are all but eliminated when integrating the gaging system into the actual machine design. Because of the reduced complexity, the overall system is likely to be more reliable than having two separate control systems. Additionally, the lower cost and complexity of the system is also attributed to there being only one controller and display that the operator would use to run the machine. The floor space will also likely be reduced by the reduction of the additional components.

Combining the control of the machine and gage functions, eliminates the need to have redundant components or hardware specific to providing communication between the machine control system and the gage control system. In the present invention, an important aspect to the integration is the communication between the machine control and gage control packages. The protocol is established between the two packages, and allows for data transfer and synchronization of control functions. The protocol can be implemented in any number of ways, and is not limited to shared memory or a sockets interface.

As another advantage, having the two systems on one controller provides the opportunity to integrate additional control systems into the machine. Besides the gage system, other related control systems like Statistical Process Control (SPC) could easily be added. Depending on the type of machine control, other common software packages like word processing, and data analysis software could also be installed and integrated into the machine control to assist in the operation of the machine.

BRIEF DESCRIPTION OF THE DRAWINGS

FIG. 5 is another high-level flow diagram showing steps of operation of an integrated machine control and gage control for post-process gaging according to the present invention.

DETAILED DESCRIPTION OF THE INVENTION

Figure 1:
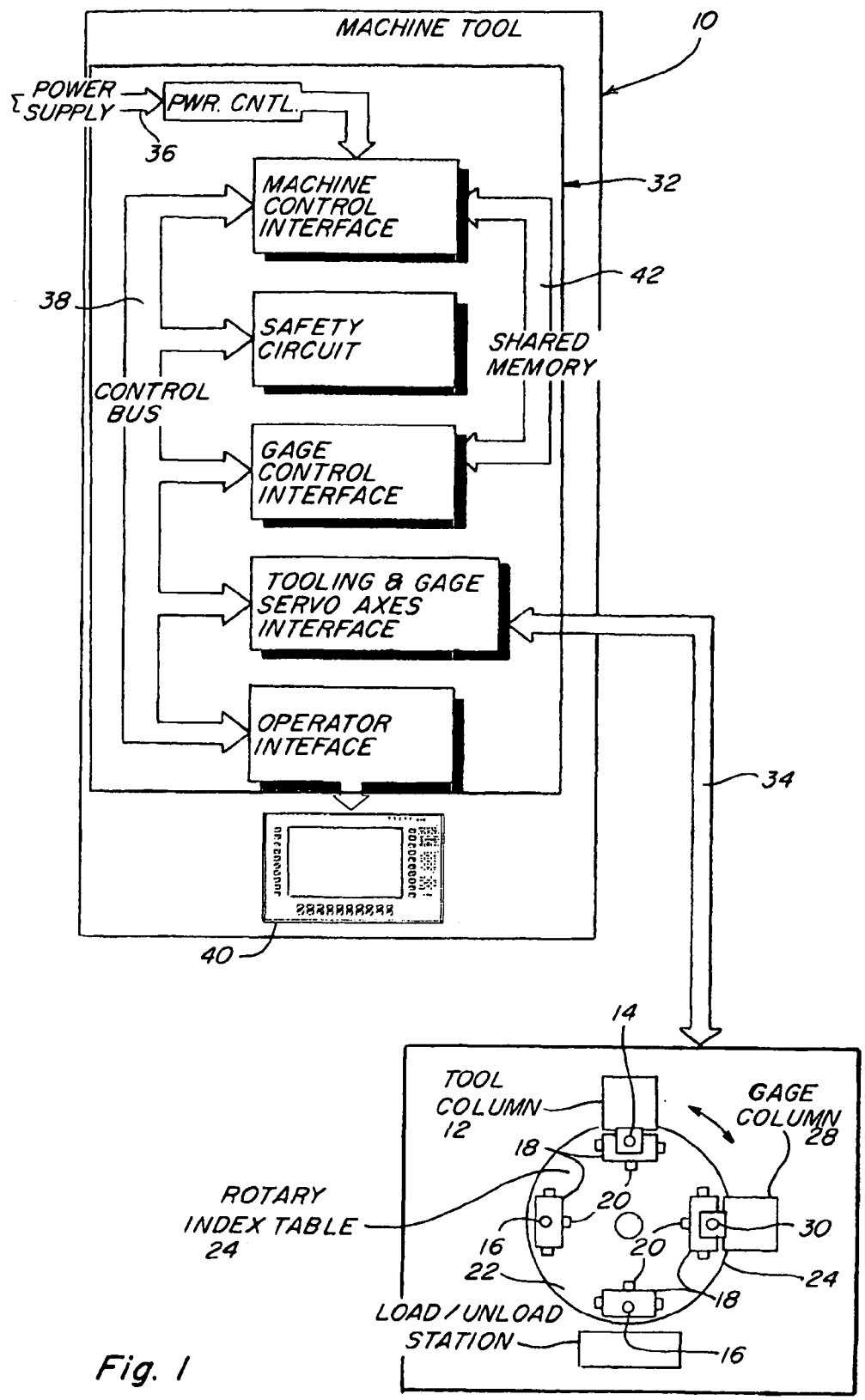
FIG. 1 is a diagrammatic representation showing a machine tool including a controller utilizing integrated machine control and gage control, according to the present invention.

Referring now to the drawings, aspects of preferred embodiments of an integrated machine control and gage control, constructed and operable according to the present invention, are shown.

In FIG. 1, a machine tool 10 is illustrated, which is intended to be representative of a wide variety of machines in which a machine control and a gage control can be integrated according to the invention. Machine tool 10 in particular, represents a honing machine having a tool column 12 or well-known construction and operation, for supporting and operating a honing tool 14 for honing bores in workpiece, such as bores 16 in workpieces 18. Generally, during a typical honing process, a cylindrical tool 14 having an outer surface containing a radially expandable outer element carrying a layer of abrasives, is positioned in a bore of a workpiece. The tool is rotated about its axis and radially expanded within the bore for applying pressure thereagainst, while reciprocating movement is effected therebetween, as denoted by the adjacent vertical arrow, for abrading material, or stock, from the bore surface, for honing or finishing the bore to a desired size and surface characteristic, in the well-known manner. A more complete description of construction and operation of the pertinent aspects of a representative honing tool column of a honing machine is contained in Cloutier, et al, U.S. patent application Ser. No. 11/596,836 entitled Honing Feed System Having Full Control of Feed Force, Rate and Position, now U.S. Pat. No. 7,371,149, the disclosure of which is hereby incorporated herein by reference in its entirety.

Figure 2:
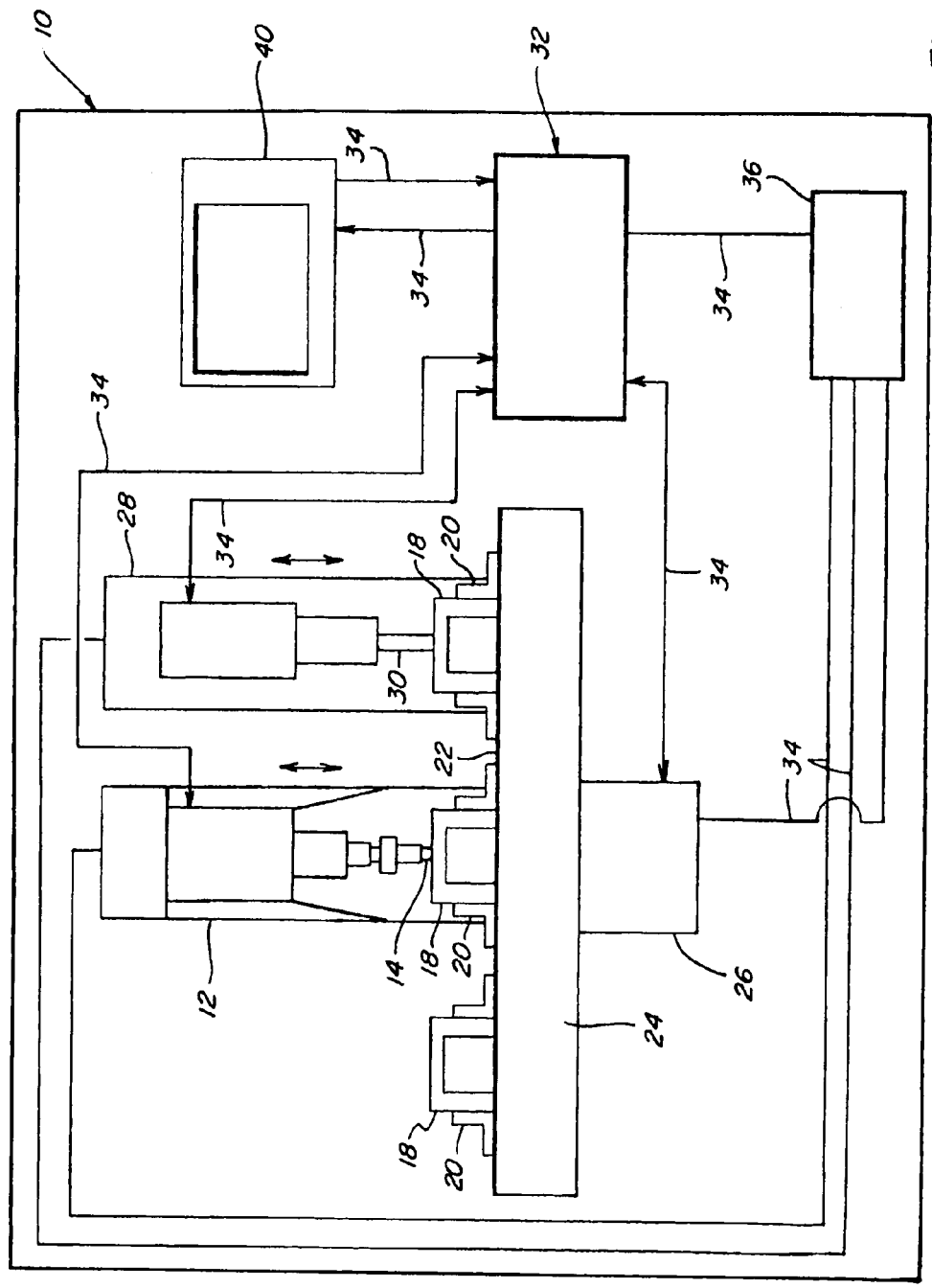
FIG. 2 is a simplified schematic representation of hardware aspects of the machine tool of FIG. 1, including an integrated machine control and gage control of the invention.

Also referring to FIG. 2, four workpieces 18 are illustrated as being held by a like number of fixtures 20, respectively, at equally spaced locations around a top surface 22 of a rotary index table 24. Table 24 is a commercially available device, controllably rotatable about its center, as denoted by the arrow in FIG. 1, by an indexing drive 26, to enable selectably individually positioning the workpieces 18 at a predetermined index position with the bore 16 thereof beneath tool 14, in the well known manner.

Machine tool 10 additionally includes a gage column 28 disposed adjacent to rotary index table 24, at a second index position, as illustrated in FIG. 1 (gage column 28 is illustrated rotated about the table for a frontal view in FIG. 2). Gage column 28 is also of well-known construction and operation, and is illustrated as an air gage, including an air probe 30 insertable into a bore 16 of a workpiece 18 at the second index position, for measuring a size and optionally one or more other characteristics of the bore, such as, but not limited to, straightness, shape, profile, and centricity about a center axis thereof. The probe motion is preferably conventionally servo controlled, i.e., vertically movable, as denoted by the accompanying arrow, such that measurements can be made at one or more locations along the length of the bore, and gage column 28 is operable for outputting a signal or signals representative of the measurements, for use by machine tool 10, as will be explained.

Machine tool 10 includes a processor based controller 32, preferably using an industrial PC architecture, having a CPU connected in operative control of tool column 12, indexing drive 26 of rotary index table 24, and gage column 28, and other servos used in the machining and gaging processes, via suitable interfaces, i.e., appropriate drivers, interface cards that can plug into slots of controller 32 in the well known manner and connected to the respective apparatus via conductive paths 34, such as wires of the wiring harness, individual or bundled cables, or a wireless network. The sensor of gage column 28 is also suitably connected to the controller CPU via an appropriate interface (i.e., plug in card or the like, and conductive path (i.e., wire 34) in the well known manner. Other sensors (if used) of the gage can also be connected to controller 32 in this, or another suitable manner. Controller 32, tool column 12, drive 26, and gage column 28, are also connected to a suitable power supply 36 for receiving power therefrom, such as a regulated line voltage, via suitable conductive paths 34 such as wires or the like.

Figure 3:
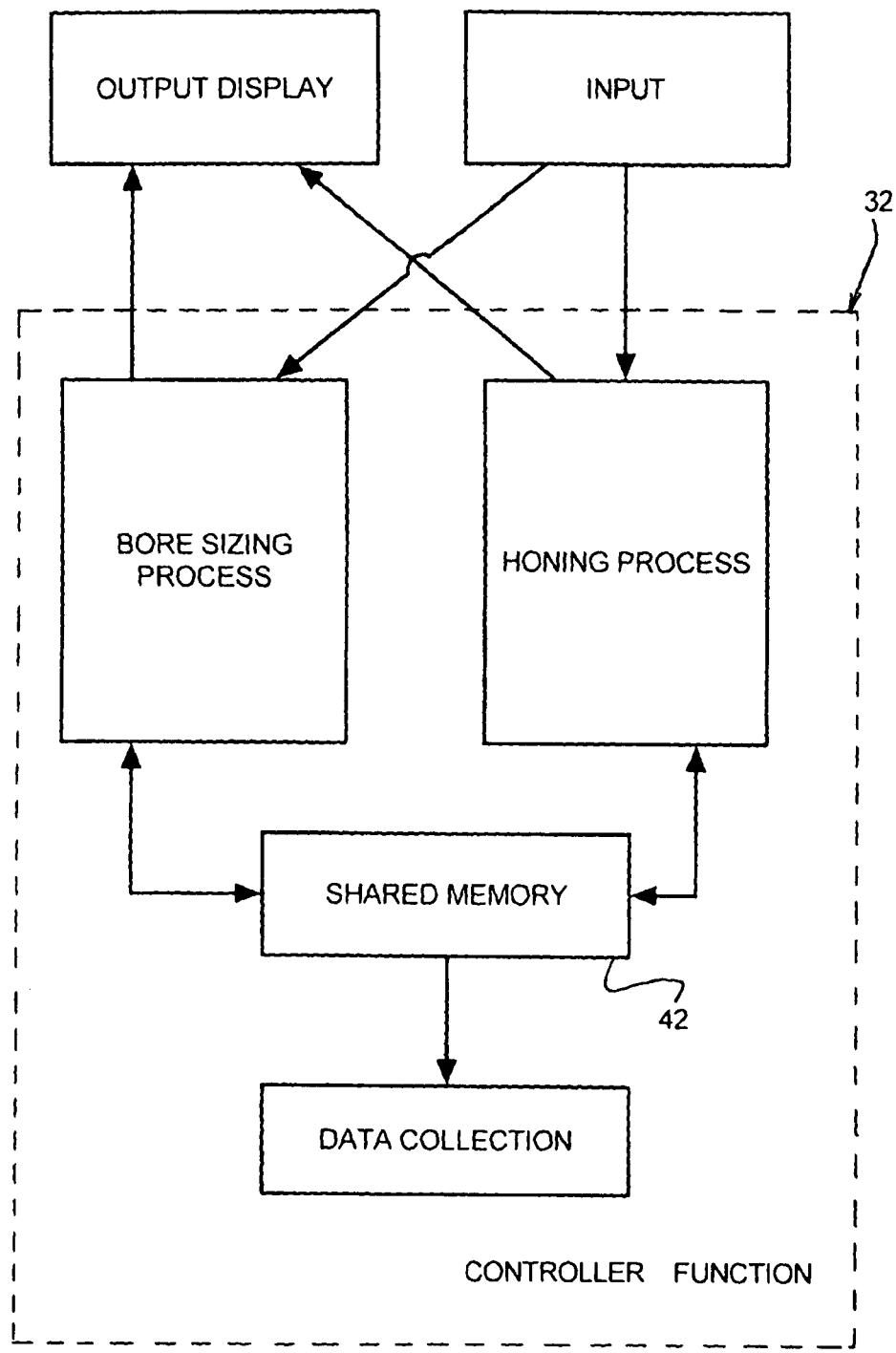
FIG. 3 is a block diagram illustrating relationships between functional aspects of the integrated machine control and gage control, according to the invention.

Referring also to FIG. 3, the system architecture of controller 32 uses a conventional control bus, denoted by arrow 38, for communications between the CPU and other devices, here, including the tooling and gage apparatus and other machine servos, and an operator interface connected to an input and display device 40, which can be, for instance, a conventional CRT or flat panel display, with touch screen functions and/or dedicated switches, keyboard, and the like. Controller 32 is configured and operable multi-tasking, including for simultaneously running several software programs, including a machine control program and a gaging control program, both of which can be proprietary or third party supplied. These programs utilize shared memory, as denoted by arrow 42 to enable the programs to access data from each other via the shared memory, i.e. a portion of the CPU's RAM, while running at the same time. This is advantageous, as it facilitates selected data, particularly newly captured gage measurement data (and older data) of the gage program, to be accessible by the machine control program virtually as soon as the data is stored in the shared memory 42, and selected machine control data, e.g. operating state data, positional data, stored in the shared memory 42 to be available directly and immediately to the gage control program, without the need for transfer over hardwired interfaces or connections, i.e., control bus 38 or a data bus, or other possibly slower communications path, such that the programs can use the other's data without delay, which thereby greatly reduces the latency so prevalent with other control methods, as discussed above.

FIG. 3 graphically depicts operations or processes that can be simultaneously performed by controller 32, to illustrate the advantage in operational speed achieved by the system of the invention utilizing shared memory 42. In particular, controller 32 is operable to run the gaging program, which can comprise, for instance, a bore sizing process for determining the size and other characteristics of a bore being measured by the probe of gage column 28, as a function of the inputs from the sensor of the gage column, as that data is received, and other information. At the same time, selected data is outputted, for instance, in text and/or graphical form, and displayed by display device 40. Also at the same time, selected data from this process is stored in shared memory 42, and is virtually immediately accessible by the machine control, for use, for instance, in a honing process simultaneously running with the bore sizing process. As another example, if the machine control is operating a servo or other apparatus, for instance, operating gage column 28 to lower air probe 30 into a bore of a workpiece located therebelow, this positional information can be stored in shared memory 42, and is immediately and directly accessible by the gage controller, for instance, so as to enable it to collect sensor data at appropriate times, or to accurately correlate the sensor data with positional data, such as the position of the probe in the workpiece bore. As still another example, bore size data for a previously honed workpiece can be determined by the gaging program, and stored in shared memory 42, for immediate use by the machine control program, for adjusting honing parameters, for instance, feed system position and/or feed force, stroke speed, dwell time, and the like, for compensating for tool wear, correcting defects, and/or imparting particular desired characteristics to the subject bore. This also enables implementing operator inputs, for instance, desired bore correction parameters, more quickly. Still further, the shared memory 42 can be configured to allow access and data collection by other programs, such as, but not limited to, statistical process control programs, that can also be run by controller 32.

Figure 4:
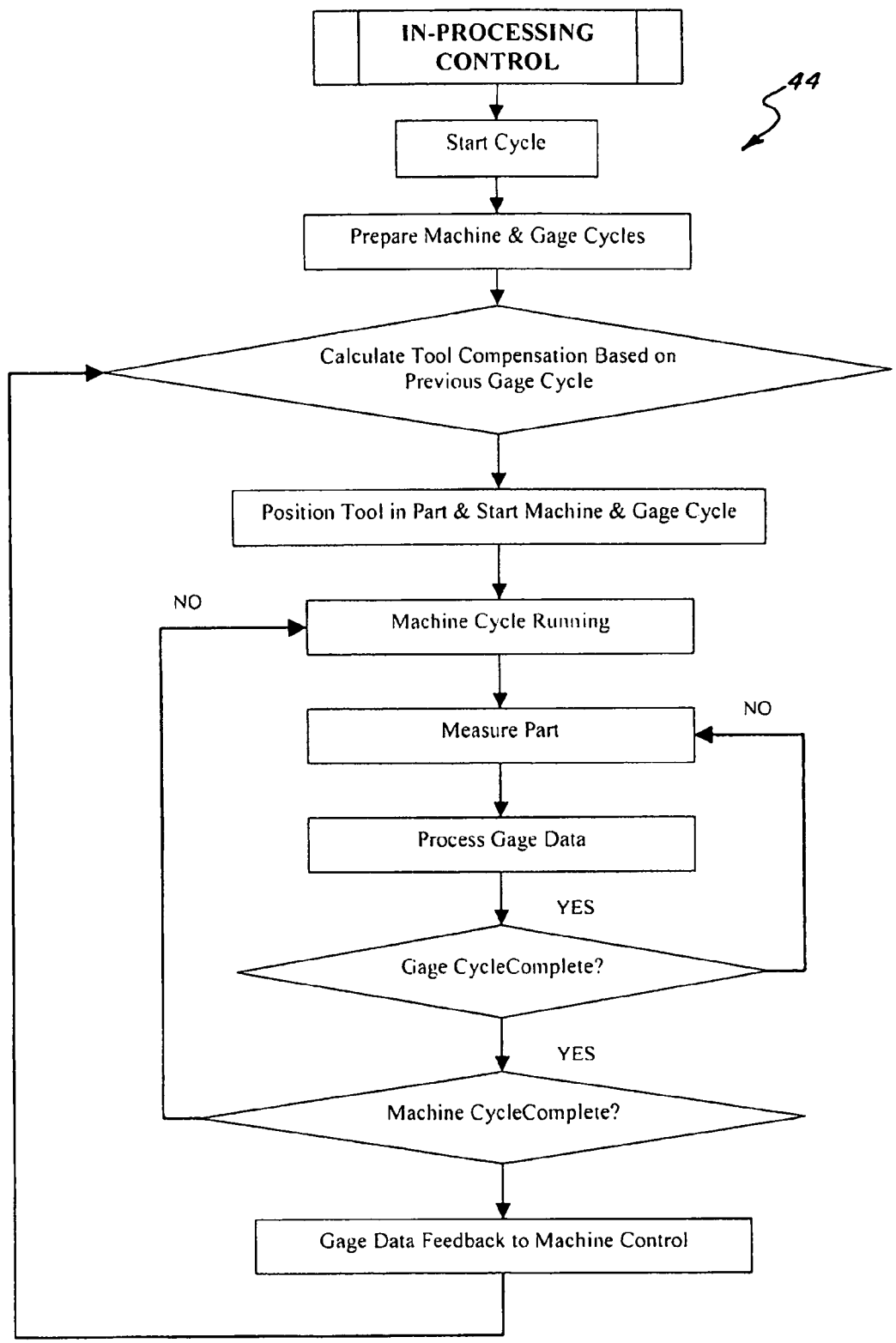
FIG. 4 is a high-level flow diagram showing steps of operation of an integrated machine control and gage control, for in-process gaging according to the present invention.

Referring also to FIGS. 4 and 5, flow diagrams 44 and 46 are shown illustrating representative steps of an in-process gaging routine, and a post-process gaging routine, respectively. Referring in particular to diagram 44 of FIG. 4, after calculation of a tool compensation value, machine and gage cycles are performed using data in the shared memory from the gage cycle. In this routine, after a machine cycle for honing a workpiece or part to some extent, the part is measured as part of a gage cycle. The gage cycle processes the measurements by the gage, and the machine cycle is then complete, only if the shared data from the gage cycle indicates that the workpiece or part has been satisfactorily honed. If not, the machine control runs the machine cycle again, and this loop is repeated, as necessary, until satisfactory gage data is present. When the machine cycle is complete, the machine control will utilize the gage data, for calculating a new tool compensation value. This data can also be utilized for other purposes, such as statistical process control.

Referring more particularly to the flow diagram 46 of FIG. 5, the machine cycle is started by the machine control, after calculation of a tool compensation value, also by the machine control, which is based on data in the shared memory from a previous gage cycle. After completion of the machine cycle, the machine control moves the workpiece or part to the gage. For machine 10, this would involve indexing table 24 to position the part beneath the gage column. The gage cycle is then initiated by the gage control, the gage probe being moved into the bore of the part, by the machine control. The gage cycle is performed, and when complete, the gage control processes the data, which is used by the machine control for calculating the new tool compensation value. Thus, it should be apparent that the above steps illustrated herein can be performed utilizing the shared data, in an expedient manner which eliminates much of the latency found to be problematic with other control methodologies. Additionally, this advantage is achieved using simplified apparatus, including a single controller, operable by a single power supply, and which can interface with a single I/O device, such as a touchscreen or the like.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A machine controller, comprising:
   a memory;
   a processor;
   a machine control for automatically controlling a honing machine operable for honing a bore of a workpiece at least partially as a function of data relating to a parameter of the workpiece, and a gage control for automatically controlling gaging apparatus for collecting and processing the data relating to the parameter of the workpiece and storing the data in the memory, the gage control being integrated with the machine control wherein the processor simultaneously runs a machine control program and a gaging program and is connected in operative control of the apparatus for performing the machining process and the gaging apparatus;

a control connection connecting the machine control and the gage control with the apparatus for performing the machining process and the gaging apparatus;

wherein at least a portion of the memory in which the data relating to the parameter of the workpiece is stored, is configured as a shared memory directly accessible by the machine control program and the gaging program separately of the control connection to allow the machine control program to immediately retrieve and use the stored data relating to the parameter of the workpiece in the machining process and to store data relating to the machining process in the shared memory for immediate retrieval and use by the gaging program; and wherein the gage apparatus comprises an air gage column including a sensor interfaced with the controller for outputting data representative of a parameter of the bore of the workpiece thereto for use by the gage control, and the machine control automatically operates to move the sensor of the air gage column into the bore of the workpiece and store positional data relating thereto in the shared memory for immediate retrieval by the gaging program to correlate the sensor data with the positional data.

2. A machine controller as claimed in claim 1, wherein the machine control program uses the data relating to the parameter of the workpiece for adjusting honing parameters including feed, stroke speed, and dwell time.

3. A machine controller as claimed in claim 1, wherein the data relating to the parameter of the workpiece, comprises data relating to a size of the bore of the workpiece.

4. A machine controller as claimed in claim 1, wherein the data relating to the parameter of the workpiece, comprises data relating to a shape of the bore of the workpiece.

5. A honing machine controller, comprising:

a memory;

a processor;

a machine control for automatically controlling apparatus for performing a honing process on a workpiece at least partially as a function of data relating to a parameter of a bore of the workpiece, and a gage control for automatically controlling gaging apparatus for collecting and processing the data relating to the parameter of the bore and storing the data in the memory, the gage control being integrated with the machine control wherein the processor simultaneously runs a machine control program and a gaging program and is connected in operative control of the apparatus for performing the honing process and the gaging apparatus;

a control connection connecting the machine control and a gage control with the apparatus for performing the honing process and the gaging apparatus;

wherein at least a portion of the memory in which the data relating to the parameter of the bore is stored, is configured as a shared memory directly accessible by the machine control program and the gaging program separately of the control connection to allow the machine control program to immediately retrieve and use the stored data relating to the parameter of the bore in the honing process and to store data relating to the honing process in the shared memory for immediate retrieval and use by the gaging program; and wherein the gage apparatus comprises an air gage column including a sensor interfaced with the controller for outputting data representative of a parameter of the bore of the workpiece thereto for use by the gage control, and the machine control automatically operates to move the sensor of the air gage column into the bore of the workpiece and store positional data relating thereto in the shared memory for immediate retrieval by the gaging program to correlate the sensor data with the positional data.

6. A honing machine controller as claimed in claim 5, wherein the machine control program uses the data relating to the parameter of the bore for adjusting honing parameters including feed, stroke speed, and dwell time.

7. A honing machine controller as claimed in claim 5, wherein the data relating to the parameter of the bore, comprises data relating to a size of the bore.

8. A honing machine controller as claimed in claim 5, wherein the data relating to the parameter of the bore, comprises data relating to a shape of the bore.

9. A honing machine controller as claimed in claim 5, wherein the honing process comprises honing the bore of a workpiece to a value determined as a function of data retrieved from the shared memory relating to a parameter of a previously honed bore, and processed and stored by the gage control program.

* * * * *